Patented Mar. 28, 1939

2,152,461

UNITED STATES PATENT OFFICE 2,152,461

METHOD FOR THE PRODUCTION OF AN ALKALI METAL SALT OF A MONO-ALKYL TRITHIOCARBONATE

William T. Bishop, Wilmington, Del., assignor to Hercules Powder Company, Wilmington, Del., a corporation of Delaware No Drawing. Application July 10, 1937, Serial No. 153,062

6 Claims. (Cl. 260—455)

This invention relates to an improved method for the production of an alkali metal salt of a mono-alkyl trithiocarbonate.

In the production of an alkali metal mono-alkyl trithiocarbonate by the reaction of a lower aliphatic mercaptan, carbon disulfide and an aqueous solution of an alkali metal hydroxide, a part or all of the product dissolves in the aqueous solution, and must be recovered by crystallization from the mother liquor, or by evaporation of the mother liquor. When recovered by crystallization from the mother liquor, a substantial quantity of the product is lost due to its solubility in the mother liquor. On the other hand, recovery of the product by evaporation of the mother liquor is a time-consuming operation, and must be conducted with great care to avoid decomposition of the product by heat.

Now in accordance with this invention, I provide a process in which the disadvantages of these recovery methods are avoided. The method in accordance with this invention comprises a cyclical process in which the mother liquor formed in one batch is used as the reaction medium in a subsequent batch.

Thus, in accordance with my invention, I may treat an alkyl mercaptan with an aqueous solution of an alkali metal hydroxide and with carbon disulfide to form the alkali metal mono-alkyl trithiocarbonate according to the reaction:

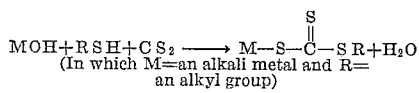

(In which M=an alkali metal and R= an alkyl group)

The major part of the product is then recovered by crystallization and separation of the crystals from the mother liquor. The mother liquor is then fortified as to its content of alkali metal hydroxide, by the addition of a very concentrated aqueous solution of the alkali metal hydroxide or solid alkali metal hydroxide. Additional alkyl mercaptan is then added to the fortified mother liquor to form the alkyl mercaptide which is then reacted with an additional carbon disulfide to form the alkali metal salt of the mono-alkyl trithiocarbonate, which is in turn crystallized and separated from the mother liquor. The mother liquor may then be used in a third cycle. This process can be, if desired, repeated through many cycles, each cycle utilizing the mother liquor remaining at the end of the preceding cycle.

Alternately, in accordance with this invention, I may treat an alkyl mercaptan simultaneously with an aqueous solution of an alkali metal hydroxide and with carbon disulfide, allow the alkali metal mono-alkyl trithiocarbonate to crystallize from the mother liquor and separate the crystals so formed. Additional alkyl mercaptan may then be added to the mother liquor. The alkali metal hydroxide in concentrated aqueous solution or in solid form and the carbon disulfide may then be simultaneously added thereto. The trithiocarbonate may then be separated from the mother liquor in crystalline form and the mother liquor utilized as the reaction medium in another cycle.

Again, in accordance with this invention, I may treat an alkyl mercaptan with carbon disulfide and then with an alkali metal hydroxide to form an alkali metal salt of a mono-alkyl trithiocarbonate. The major portion of the product as formed is then recovered from the reaction mixture by allowing it to crystallize and separating the crystals so formed. Additional alkyl mercaptan may then be added to the mother liquor, followed in turn by the addition of carbon disulfide and an alkali metal hydroxide in concentrated aqueous solution or in solid form. The trithiocarbonate may then be separated from the mother liquor in crystalline form and the mother liquor utilized as the reaction medium in another cycle.

Thus, it will be appreciated that I may add the reagents to the reaction mixture in any desired order, and that the order of such addition is in no way critical.

By means of this invention, I make a practically complete recovery of the alkali metal salt of the mono-alkyl trithiocarbonate. After the first cycle the mother liquor is saturated with the trithiocarbonate and, hence, in later cycles the trithiocarbonate crystallizes out of the mother liquor as fast as it forms. In this way I avoid the loss of trithiocarbonate due to its solubility in water. I also avoid any necessity for recovering the dissolved trithiocarbonate by a delicate evaporation procedure.

In carrying out the method in accordance with this invention, I find surprising enough, that the alkali metal salt of the mono-alkyl trithiocarbonate remaining in solution in the mother liquor and any by-products which may have been formed, have no deleterious effect on the product. This is very surprising to me, in view of the instability of products of this type and their sensitiveness to various factors in the reaction.

In carrying out the method in accordance with this invention I prefer to use substantial molecular proportions of the alkali metal hydroxide and the carbon disulfide with either a molecular proportion of the alkyl mercaptan, or an amount of the alkyl mercaptan slightly in excess of molecular proportions. In any case it is desirable to carry the reaction to completion so that a minimum of free alkali metal hydroxide remains in the final product, since its presence tends to cause the product to be unstable.

In carrying out the reaction in accordance with this invention it is desirable, although not essential, to avoid oxidizing conditions, and hence I prefer to exclude oxygen from the reaction mixture during the reaction. This may conveniently be done by blanketing the reaction mixture with a non-oxidizing gas, such as, for example, nitrogen, carbon disulfide, alkyl mercaptan, etc.

The alkyl mercaptan used in this method may be any pure aliphatic mercaptan, such as, for example, methyl mercaptan, ethyl mercaptan, propyl mercaptan, isopropyl mercaptan, butyl mercaptan, isobutyl mercaptan, the various isomeric amyl mercaptans, mixtures thereof, etc., or I may use a crude mixture of the mercaptans, such as obtained as a by-product in the refining of petroleum. Substances non-reactive under the conditions of reaction, such as, for example, organic sulfides, hydrocarbons, etc. do not interfere with the reaction and do not harm the product for use as a flotation reagent, provided they are not present in excessive quantities. Thus, such materials in crude mixtures of mercaptans obtained, for example, as a by-product of the refining of petroleum are not detrimental.

It will be appreciated that in this method, the alkyl mercaptan reacts at the mercaptan group and not at the alkyl group. The alkyl group does not act as a functional group and may be purely hydrocarbon in character or may contain hydrocarbon groupings as well as other groups provided, however, that such groups are substantially non-reactive under the conditions employed. In any case, the mercaptan group will be connected directly to a carbon atom contained in an alkyl hydrocarbon group. Thus, for example, I may react an alkyl mercaptan, the alkyl group of which contains somewhere in its structure an ether linkage, and thereby obtains a sodium mono-alkyl trithiocarbonate which likewise contains an ether linkage within its alkyl group. It will accordingly be appreciated that where I use the term "alkyl" herein, I do not limit myself to a group which is entirely hydrocarbon in character, but use the term to include all groups of the type indicated, including those which are purely hydrocarbon in character.

The alkali metal hydroxide which I use may be for example, sodium hydroxide, potassium hydroxide, lithium hydroxide, etc.

The temperature at which I carry out the reaction in accordance with this invention may be within the range of about 0° C. to an upper limit set by the reflux temperature of the volatile ingredients of the reaction mixture and preferably within the range of about 0° C. to about 40° C.

The time of reaction, on each cycle, will be that required for the reaction to go to completion. The end of the reaction can be readily determined by the heat evolved by the reaction mixture. When the mixture ceases to evolve heat the reaction is substantially complete. The actual time required will depend upon a number of variable factors such as quantities of reactants, efficiency of stirring, etc., and can only be accurately set in terms of appearance and heat evolution of the mixture.

In carrying out the process in accordance with this invention the product from one batch may be separated from the mother liquor by filtration as illustrated in Example I. Alternately it may be separated by decantation or centrifuging, as may be convenient.

The method in accordance with this invention is further illustrated by the following example:

EXAMPLE I

Batch A

To 25 parts by weight of ethyl mercaptan, in a suitable container equipped with stirring, was added 40 parts by weight of 40% aqueous NaOH solution slowly from a dripping funnel. The reaction mixture was cooled by means of cold water surrounding the reaction vessel to prevent the heat evolved by the reaction from raising the temperature above about 40° C. To this mercaptide was then added 30.5 parts by weight of $CS_2$ slowly with continued stirring and cooling to keep the temperature below about 40° C. After the addition of all the $CS_2$, the yellow sodium ethyl trithiocarbonate separated out. The stirring and cooling of the reaction mass was continued for about one hour, which helped the crystallization of the product. The mother liquor was suction filtered from the trithiocarbonate and saved. The weight of dried sodium ethyl trithiocarbonate was 57.0 parts by weight corresponding to 88.7% yield by this first crystallization.

Batch B

The mother liquor from Batch A, amounting to approximately 25 parts by weight, was used for the starting of this run. Twenty-five parts by weight of ethyl mercaptan were added to the mother liquor and treated with 40 parts by weight of 40% aqueous NaOH exactly as in Batch A. Then 30.5 parts by weight of $CS_2$ were added with stirring and cooling. The stirring and cooling was continued for about one hour and the yellow sodium ethyl trithiocarbonate crystallized out as before. After suction of the mother liquor and drying of the trithiocarbonate, 60.0 parts by weight were obtained giving a 93.2% yield.

It will be appreciated that the mother liquor from Batch B may be used in the third batch, and so on continuously. In this way the aqueous solutions used in the reaction are at all times substantially saturated with the product, so that after the first batch practically no additional product is lost by solution in the mother liquor. When the mother liquor from a preceding batch is fortified with concentrated or solid caustic, there will be essentially no further loss of product due to solution in the mother liquor.

It will be understood that the details and examples hereinbefore set forth are illustrative only and that the invention as herein broadly described and claimed is in no way limited thereby.

What I claim and desire to protect by Letters Patent is:

1. A method for the manufacture of an alkali metal salt of a mono-alkyl trithiocarbonate, which comprises reacting an alkyl mercaptan with an aqueous solution of an alkali metal hydroxide which contains dissolved therein the alkali metal salt of the mono-alkyl trithiocarbonate and with carbon disulfide, and crystallizing and separating the mono-alkyl trithiocarbonate from the reaction mixture.

2. A method for the manufacture of an alkali metal salt of a mono-alkyl trithiocarbonate, which comprises reacting an alkyl mercaptan with an aqueous solution of an alkali metal hydroxide substantially saturated with the alkali metal salt of the mono-alkyl trithiocarbonate, and with carbon disulfide, and crystallizing and separating the mono-alkyl trithiocarbonate from the reaction mixture.

3. A method for the manufacture of an alkali metal salt of a mono-alkyl trithiocarbonate, which comprises reacting an alkyl mercaptan with an aqueous solution of an alkali metal hydroxide and with carbon disulfide, crystallizing and separating the alkali metal salt of the mono-alkyl trithiocarbonate from the reaction mixture, adding alkyl mercaptan, solid alkali metal hydroxide and carbon disulfide to the reaction mixture, and crystallizing and separating alkali metal salt of mono-alkyl trithiocarbonate therefrom.

4. A method for the manufacture of an alkali metal salt of a mono-alkyl trithiocarbonate, which comprises reacting an alkyl mercaptan with an aqueous solution of an alkali metal hydroxide and with carbon disulfide, crystallizing and separating the alkali metal salt of the mono-alkyl trithiocarbonate from the reaction mixture, adding alkyl mercaptan, concentrated aqueous alkali metal hydroxide and carbon disulfide to the reaction mixture, and crystallizing and separating alkali metal salt of mono-alkyl trithiocarbonate therefrom.

5. A method for the manufacture of an alkali salt of a mono-alkyl trithiocarbonate, which comprises reacting an alkyl mercaptan with an aqueous solution of an alkali metal hydroxide substantially saturated with the alkali metal salt of the mono-alkyl trithiocarbonate, and with carbon disulfide, the said alkyl mercaptan, alkali metal hydroxide and carbon disulfide being in substantially molecular proportions, and crystallizing and separating the mono-alkyl trithiocarbonate from the reaction mixture.

6. A method for the manufacture of an alkali metal salt of a mono-alkyl trithiocarbonate, which comprises reacting an alkyl mercaptan with an aqueous solution of an alkali metal hydroxide substantially saturated with the alkali metal salt of the mono-alkyl trithiocarbonate, and with carbon disulfide, the said alkyl mercaptan, alkali metal hydroxide and carbon disulfide being in proportions such that the alkali metal hydroxide is substantially completely consumed in the reaction, and crystallizing and separating the mono-alkyl trithiocarbonate from the reaction mixture.

WILLIAM T. BISHOP.